F. C. JONES.
APPARATUS FOR AND PROCESS OF MAKING STYLI FOR USE IN CONNECTION WITH THE
REPRODUCTION OF SOUND FROM TALKING MACHINE RECORDS.
APPLICATION FILED JAN. 15, 1919.

1,368,936.

Patented Feb. 15, 1921.

WITNESS
F. J. Hartman.

INVENTOR
Frederick C. Jones,
BY
ATTORNEYS

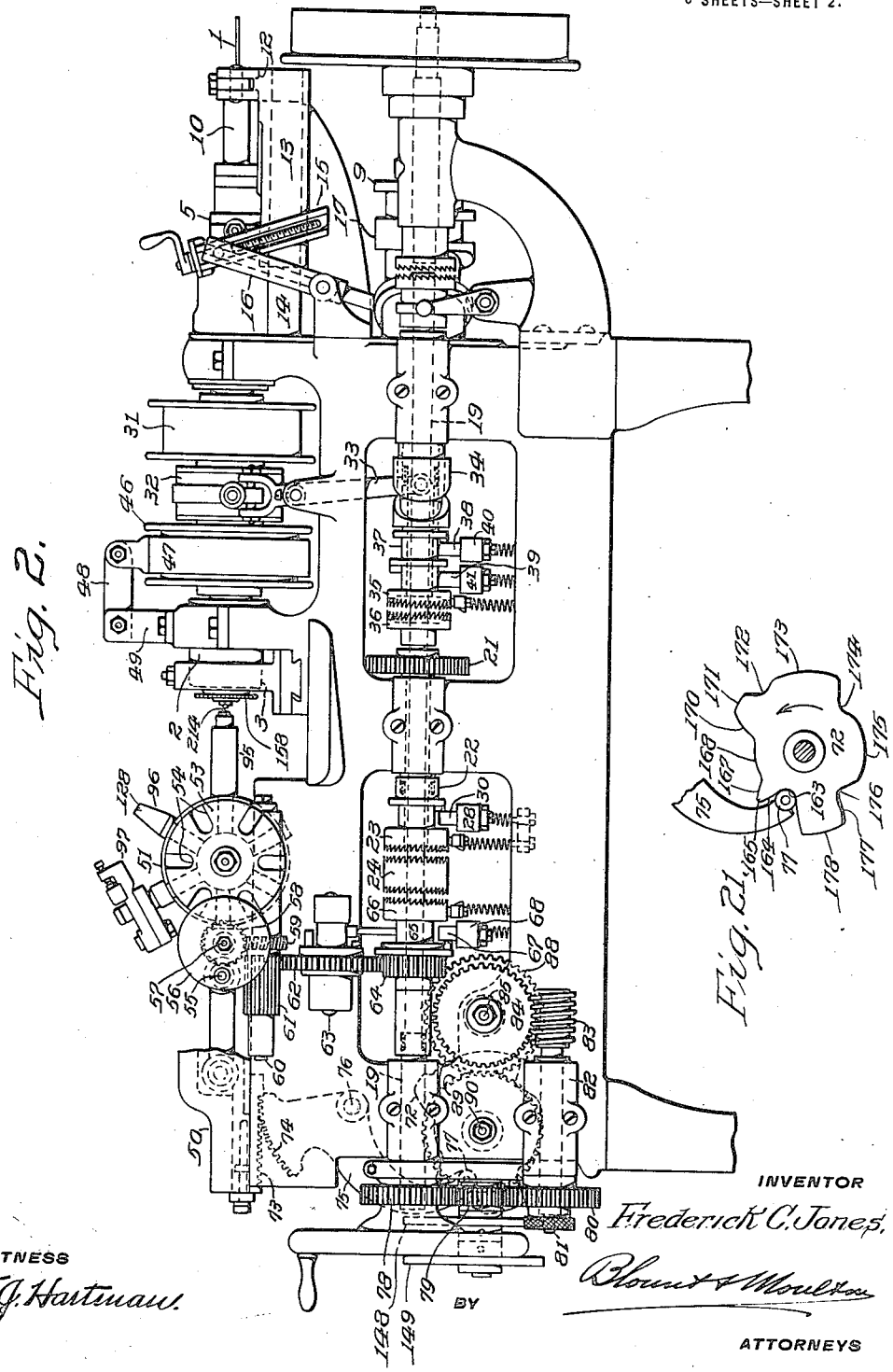

F. C. JONES.
APPARATUS FOR AND PROCESS OF MAKING STYLI FOR USE IN CONNECTION WITH THE
REPRODUCTION OF SOUND FROM TALKING MACHINE RECORDS.
APPLICATION FILED JAN. 15, 1919.
1,368,936. Patented Feb. 15, 1921.
6 SHEETS—SHEET 3.
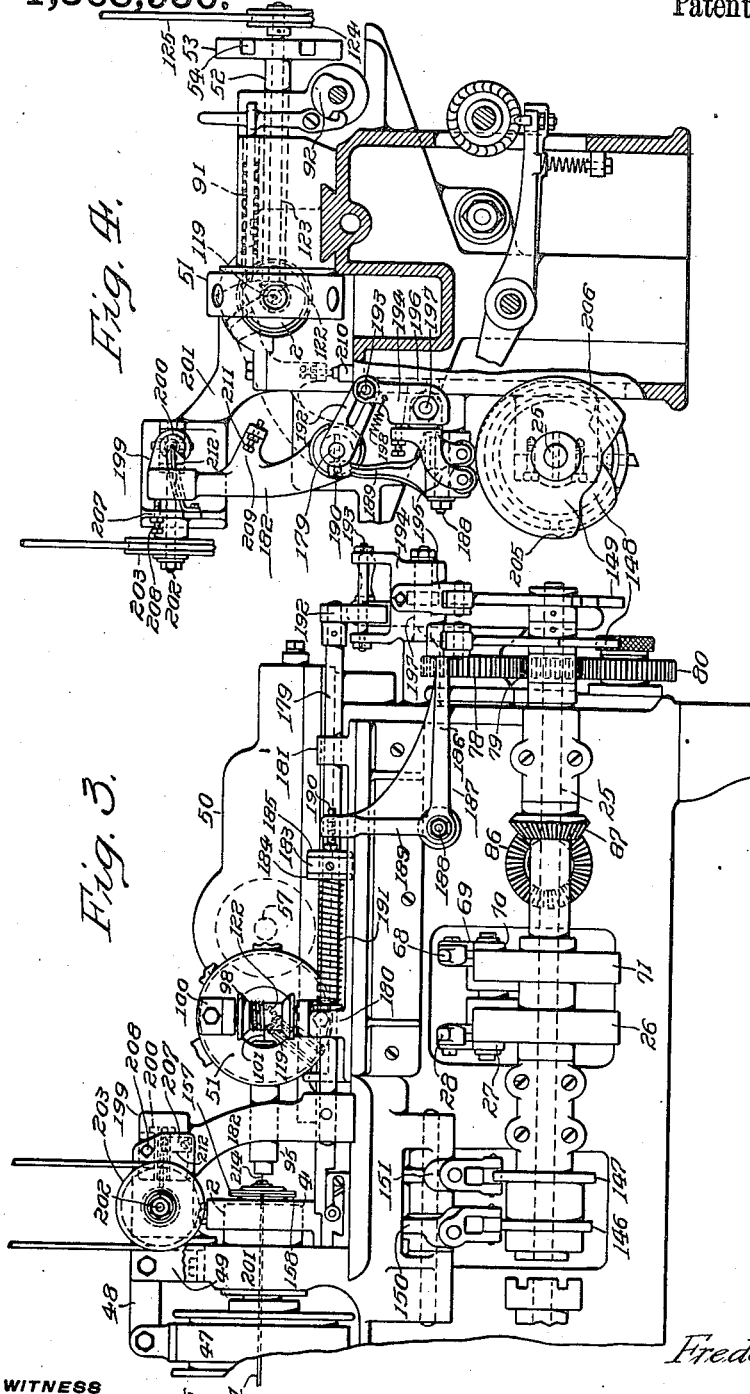

F. C. JONES.
APPARATUS FOR AND PROCESS OF MAKING STYLI FOR USE IN CONNECTION WITH THE REPRODUCTION OF SOUND FROM TALKING MACHINE RECORDS.
APPLICATION FILED JAN. 15, 1919.

1,368,936.

Patented Feb. 15, 1921.

INVENTOR
Frederick C. Jones.

WITNESS
F. J. Hartman.

BY Blount & Moulton
ATTORNEYS

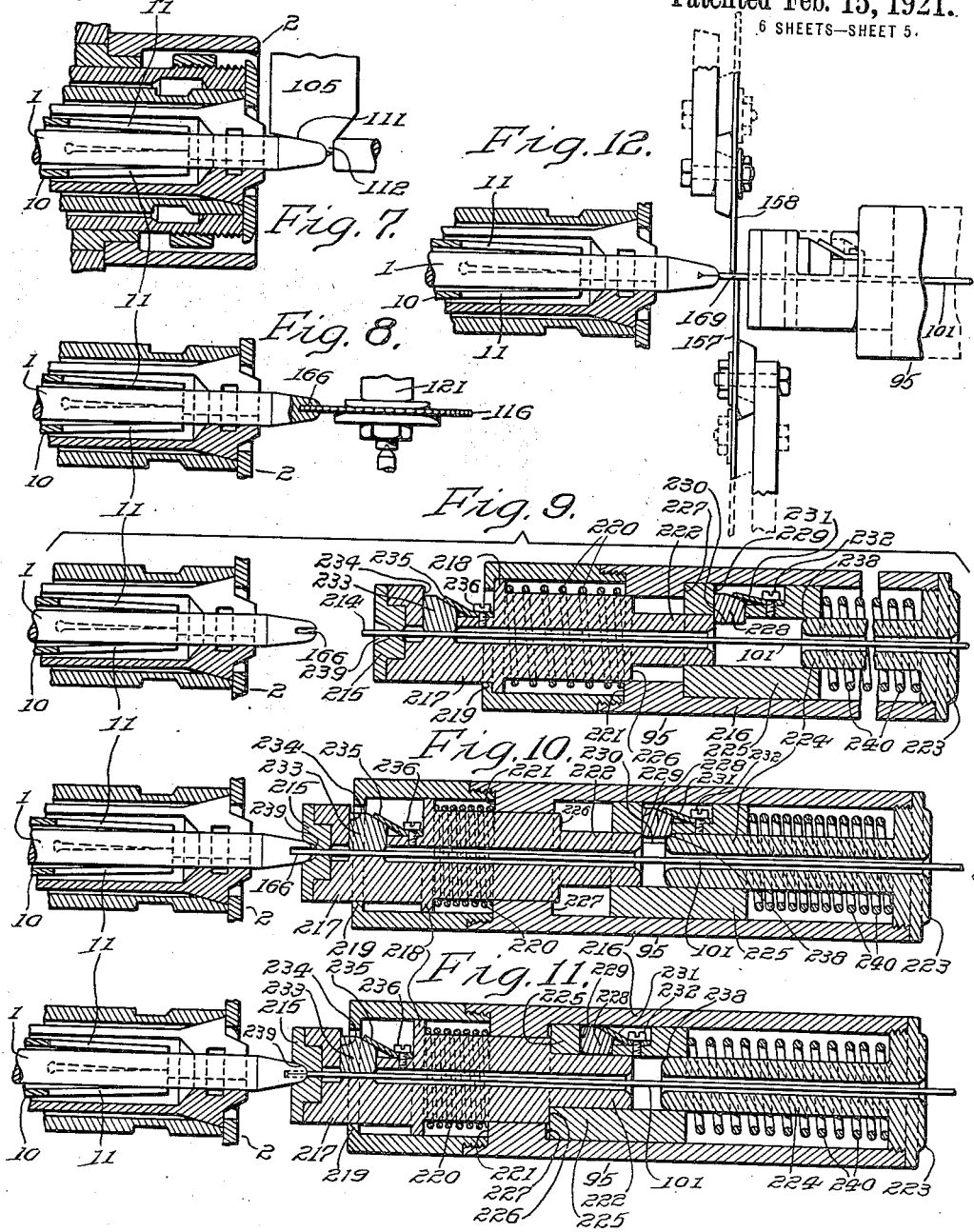

F. C. JONES.
APPARATUS FOR AND PROCESS OF MAKING STYLI FOR USE IN CONNECTION WITH THE REPRODUCTION OF SOUND FROM TALKING MACHINE RECORDS.
APPLICATION FILED JAN. 15, 1919.
1,368,936. Patented Feb. 15, 1921.
6 SHEETS—SHEET 6.
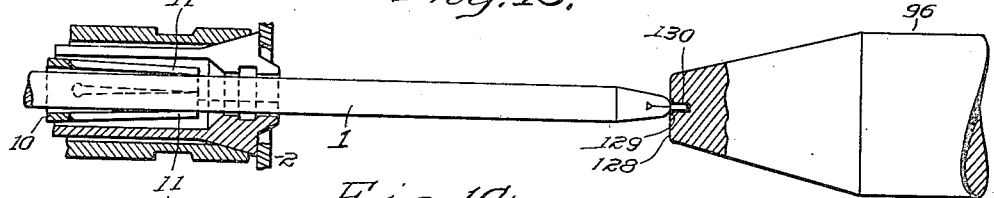
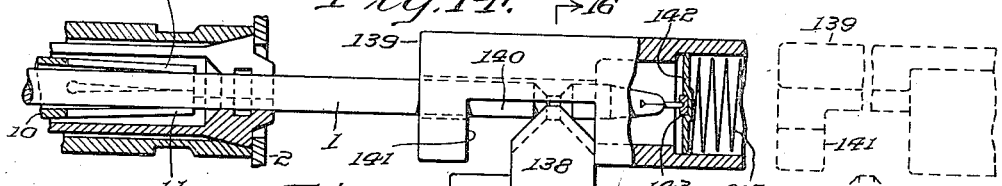
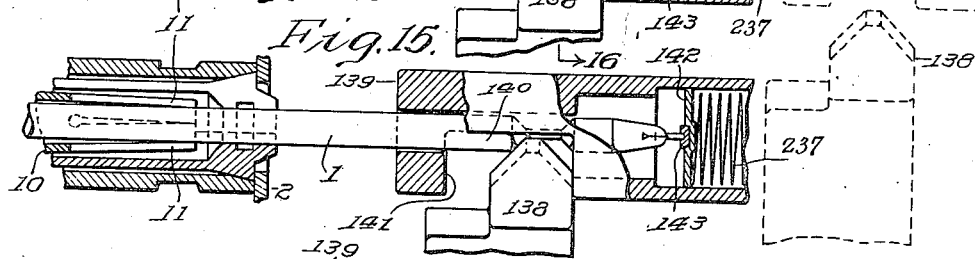
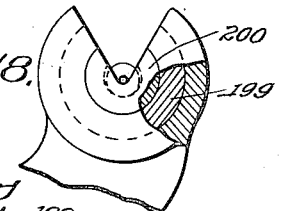
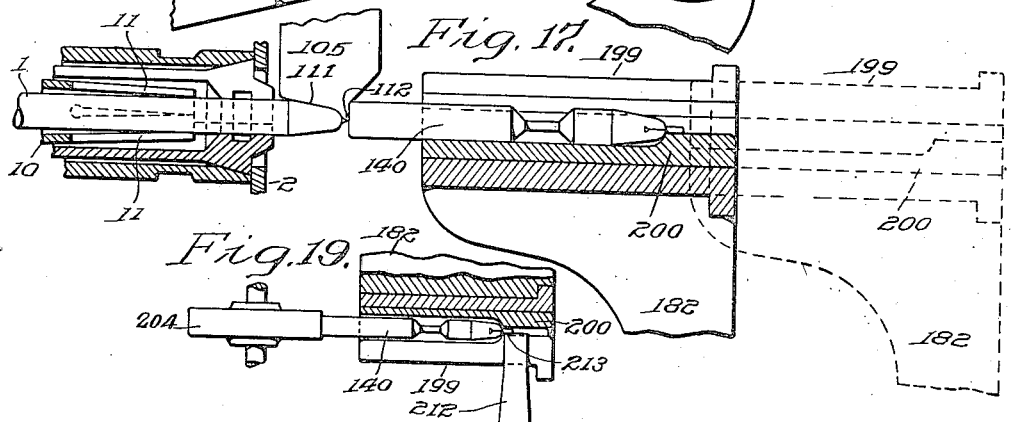
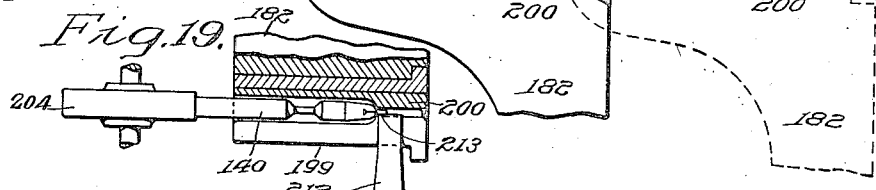
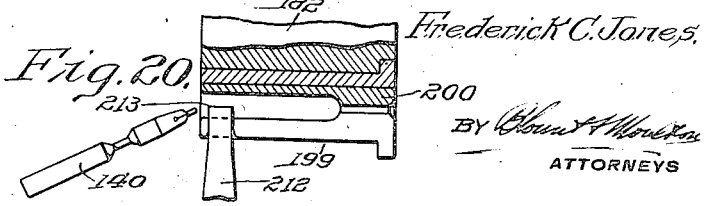
WITNESS
F. J. Hartman.
INVENTOR
Frederick C. Jones,
BY
ATTORNEYS

UNITED STATES PATENT OFFICE.

FREDERICK C. JONES, OF CAMDEN, NEW JERSEY, ASSIGNOR TO VICTOR TALKING MACHINE COMPANY, A CORPORATION OF NEW JERSEY.

APPARATUS FOR AND PROCESS OF MAKING STYLI FOR USE IN CONNECTION WITH THE REPRODUCTION OF SOUND FROM TALKING-MACHINE RECORDS.

1,368,936. Specification of Letters Patent. Patented Feb. 15, 1921.

Application filed January 15, 1919. Serial No. 271,215.

*To all whom it may concern:*

Be it known that I, FREDERICK C. JONES, a citizen of the United States, and a resident of Camden, in the county of Camden and State of New Jersey, have invented certain new and useful improvements in apparatus for and processes of making styli for use in connection with the reproduction of sound from talking-machine records, of which the following is a full, clear, and exact disclosure.

My invention relates to means for and the process of making styli for sound reproducing machines in which the tip or record engaging portion of the stylus may be, and preferably is, composed of a different material from that of the shank or body portion of the stylus, the means and process of this application being for the purpose of uniting a record engaging tip or point to a shank or body portion of a stylus in such a manner that the shank and tip or point are so firmly united as to form a substantially unitary stylus having a shank or body portion of one material and an extremely small portion inserted into the end of the body portion, of a different material, the latter forming the record engaging tip thereof.

One form of stylus, such as has been above referred to and which it is the object of the present invention to produce, is shown and described in Letters Patent of the United States, No. 1,251,908, granted January 1, 1918. One of the purposes of the present invention is to make such a stylus, or a stylus similar thereto, with a shank of steel or other easily wrought material and a record engaging tip or point of tungsten, tungstenic, or other relatively expensive, less easily wrought material, firmly and permanently united thereto. The present invention involves the means for and the method of producing such sound reproducing styli.

One of the objects of the present invention is to carry out all the steps of a process of making a complete composite stylus, automatically, without intermediate changing operation, or unnecessary or manually performed operations, and one of the objects of this invention is to provide a mechanism which is absolutely automatic from the feeding of continuous lengths of body and record engaging material into the machine to the time when the product is delivered from the machine in the form of a complete stylus adapted for immediate use in reproducing sound from talking machine records.

Machines for making finished articles out of and from continuous lengths of stock material are, of course, not uncommon. An example of such is illustrated in U. S. Patent No. 604,306, granted May 17, 1898. Generally speaking, such machines comprise a head mechanism through which material is intermittently fed, rotated and held for the performance on the stock of various operations; a turret mechanism for presenting various tools in predetermined sequence to the stock in the head, cross slide mechanisms whereby other mechanical operations are performed on the stock, as, for instance, turning, threading, cutting off, etc., and transferring mechanisms whereby, after severance from the stock, the article is bodily transferred and carried either out of the machine or to a position in which other mechanical operations are performed thereon.

The particular mechanism illustrated in and forming a part of this application is, generally speaking, of the type above described, but the same has been modified, altered, arranged and adapted to perform in addition to other functions, the step of inserting into a recess in the end of the stock, the end of a continuous length of fine wire, and swaging the end of the stock into permanent engagement with the wire, said fine wire being fed to and through the swaging tool. However, for the performance of operations and steps not particularly described and set forth in the present specification, refernce may be had to said patent.

A further object of this invention is to unite a relatively fine wire to the shank by use of a single device or tool and in practically one general step of the process.

A further object of the invention is to insert a fine wire into a recess provided therefor in the end of the shank, and substantially simultaneously swaging the shank around said insert to permanently secure the same thereto.

Other objects as arise in carrying out the process will more clearly appear in the specification and claims below.

In the drawings forming a part of this application, the same reference characters are used to designate the same parts throughout the various views. It should be mentioned, however, that several of the figures of the drawings are made on a somewhat enlarged scale and in a somewhat diagrammatic manner for the sake of clearness.

Fig. 2 is a rear elevation of the same;

Fig. 3 is a front elevation of one end of the machine with transfer and burring attachment shown in place, and with certain parts omitted for the sake of clearness;

Fig. 4 is an end view of the same;

Fig. 7 is a diagrammatic top plan view of the essential parts for carrying out the first step of the process of making a stylus wherein a rod of malleable metal is held in a rotating chuck or collet and is in the act of being cut and formed by a combined cutting-off and forming tool;

Fig. 8 is a similar view in side elevation of the next step wherein the rod is stationarily held in the chuck and is in the act of being recessed or slotted by a rotating cutter;

Fig. 9 is a similar view in side elevation of the next step wherein a combined tungsten wire carrier and swaging tool is brought in position opposite the slotted end of the rod preparatory to inserting the end of the wire in the slot of said rod;

Fig. 10 is a view similar to Fig. 9 with the exception that the combined wire carrier and swaging tool has advanced to the position where the end of the tungsten wire is inserted in the slot and the die of the tool is in contact with the formed or tapered end of the rod or shank portion;

Fig. 11 is a view similar to Fig. 10 with the exception that the swaging tool mentioned has operated to swage the tapered end of the rod or shank portion of the stylus about the end of the tungsten wire;

Fig. 12 is a plan view showing the wire swaged into the shank, the inserting and swaging tool withdrawn a certain distance and the laterally moving shearing cutters in the act of cutting the tungsten wire;

Fig. 13 is a plan view of the rod, with the inserted tungsten wire cut off at proper length, fed outwardly to a stop means, the position of which gages the proper length of the shank to be later cut off;

Fig. 14 is a plan view of the tool for necking the shank, and also the means for the smoothing or burring of the end of the tungsten tip, the tool being shown in dotted lines prior to its engagement to the shank, and in full lines in its first phase of cutting the neck portion;

Fig. 15 is a view similar to Fig. 14 with the necking tool at its terminal phase of cutting;

Fig. 16 is an end view on line 16—16 of Fig. 14 of the tool used in necking the shank as shown in Figs. 14 and 15;

Fig. 17 is a plan view of the nearly completed stylus and of the cutting off and forming tool in the act of cutting off the nearly completed stylus and simultaneously forming the end of the next stylus shank, and also shows a transferring means holding the nearly completed stylus during this operation;

Fig. 18 shows an end view of the transferring means;

Fig. 19 is a plan view of the transferring means holding the nearly completed stylus against a burring means whereby the rear end of the stylus shank is properly burred;

Fig. 20 is a view of the completed stylus in the act of being ejected from the transferring means; and Fig. 21 is a detail view of the turret operating cam.

Figure 1:
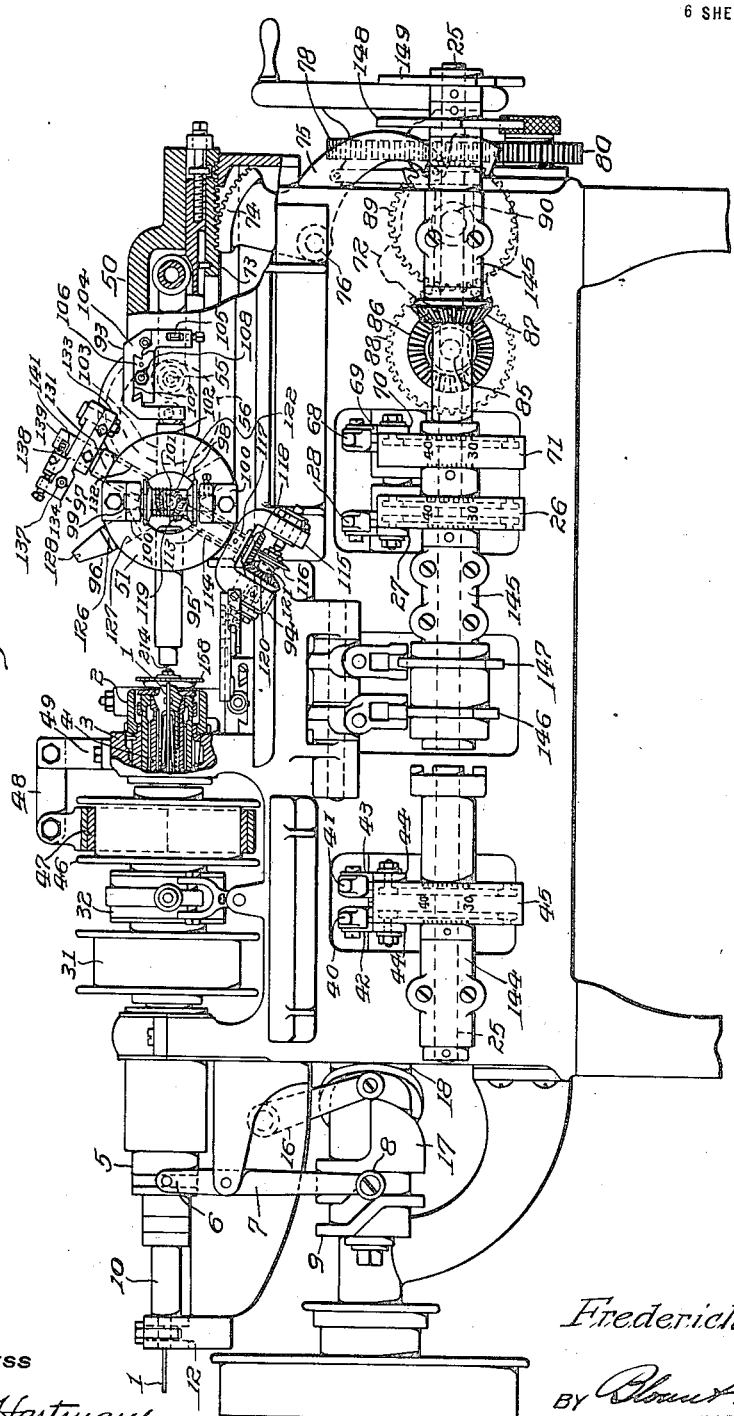
Figure 1 is a front elevation of an automatic screw machine of the type used for carrying out the herein disclosed invention.
Figure 5:
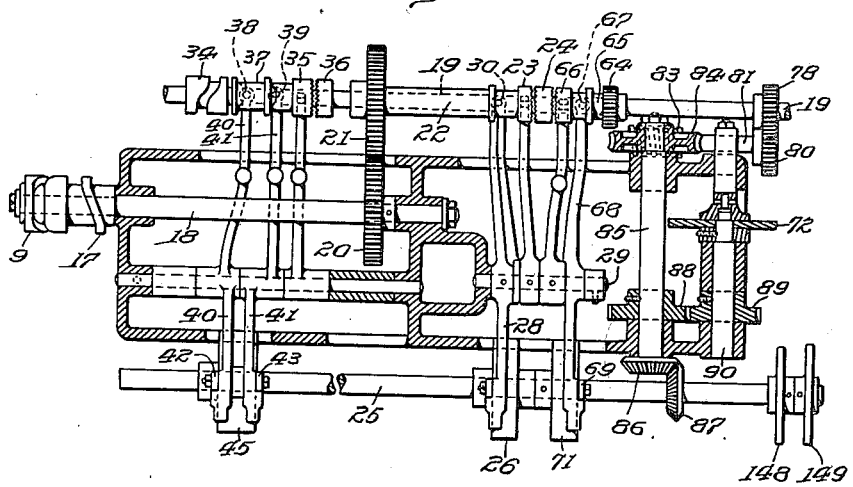
Fig. 5 is a top plan view of a portion of the mechanism within the machine, showing more particularly the drive connections for the chuck and the rod stock feed means.
Figure 6:
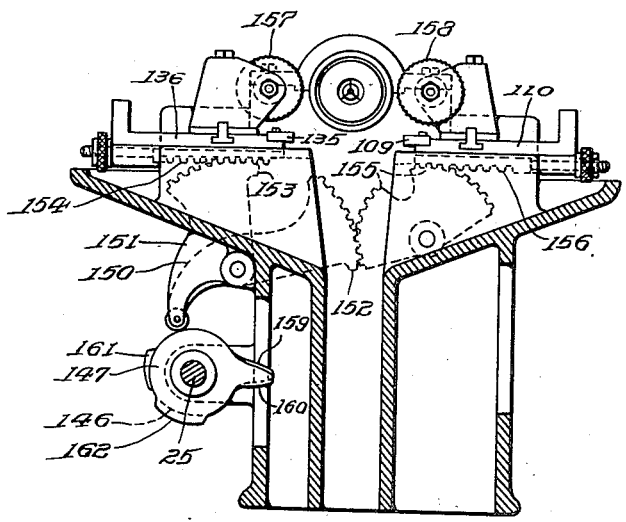
Fig. 6 is an end view of the machine showing more particularly the cross-slide means which carry the tungsten wire cutters and the contact plates for engagement with the necking and cutting-off tools.

In carrying out my invention, the machine shown in the accompanying drawings may be utilized and is herein generally described.

In the construction shown, the rod 1 from which the shank portions of the styli are made, and which may be of indefinite length, is held coaxially within the expansible spring collet or chuck 2 mounted within the spindle head 3 of the machine with the end of said rod protruding from the jaws of the chuck sufficiently for the performance of the operations of the tools carried by the turret.

At certain predetermined intervals the spring jaws of the chuck are engaged with the rod or disengaged therefrom by means of the chuck sleeve 4, the rear end of which extends beyond the rear end of the spindle and is provided with a grooved collar 5 within the groove of which is adapted to operate the yoke end 6 of the lever 7, the other end of the lever being provided with a roller 8 operating within the groove of the chuck cam 9 secured to the end of the cam shaft 18. The rotation of this cam imparts longitudinal movement to the collar, which, through well-known mechanisms, is adapted to cause the jaws of the chuck to grasp the rod or to spring away therefrom.

The chuck spindle further carries a stock feed tube 10 which is provided at one end thereof with the usual spring fingers 11 for grasping the rod stock and which projects at the other end from the rear end of the spindle. The projected end of the tube carries a grooved collar 12 which is connected to a slide 13 adapted to reciprocate upon the slide-way 14 fixed to the frame of the machine. A feed adjustment screw means 15 is rigidly mounted upon this slide and is connected to one end of the feed lever 16, the other end of which operates in a groove in the cam 17 secured to cam shaft 18, upon the end of which is also secured chuck cam 9. Rotation of this cam at prescribed intervals accordingly, causes the stock feed tube to longitudinally reciprocate within the chuck spindle, the tube, in its forward movement, with the collet jaws open and the tube fingers clasping the rod, operating to feed the stock forwardly through the chuck, and in its rearward movement, with the collet jaws clasped upon the rod and holding it stationary, operating to slide rearwardly over said rod, into place prior to its feeding movement for the next rod feed.

The above-mentioned cam shaft 18, which is located within the machine, is given a complete revolution at predetermined intervals from the main drive shaft 19 to which it is connected by the spur gear 20 mounted upon the end of the cam shaft and the spur gear 21 secured to a sleeve 22 loosely mounted upon the main shaft. The end of this sleeve is provided with a clutch jaw 23 adapted to clutch with the clutch jaw 24 fixed to the main shaft. For the purpose of throwing these clutch jaws into and out of clutching engagement, there is provided upon the front of the machine, a front cam shaft 25, to which is fixed a tappet disk 26 carrying a series of adjustably placed tappets 27 adapted to engage with and raise the forward end of the lever 28 fulcrumed upon the stud shaft 29. At the other end of the lever 28 is provided a member 30 adapted to coact with the clutch jaw 23 for the purpose of clutching the same with the clutch jaw 24. Inasmuch as the clutch jaw 24 is constantly rotating, the clutching of the jaw 23 therewith imparts rotary movement to the sleeve 22 and the spur gear 21 and consequently the cam shaft 18 upon which are mounted the cams 9 and 17. The clutch jaws are automatically disengaged after the completion of a revolution of the cam shaft 18.

The spindle and chuck are rotated in the usual manner by means of the belt driven pulley 31 which is loosely mounted upon the spindle and may be thrown into operation by engagement therewith of the clutch 32. This clutch is provided with the usual ring and yoke attachment and may be thrown into operation by the connected stop lever 33 adapted to coöperate with the cam 34 loosely mounted upon the main shaft. This cam is given a half revolution at predetermined intervals by the clutching of the clutch jaw 35 with the clutch jaw 36 fixed to the main shaft. Both the cam 34 and clutch jaw 35 are mounted upon a sleeve 37 adapted to be moved under the influence of a suitable spring upon the movement of the members 38 and 39 mounted upon the end of the levers 40 and 41 respectively. The other ends of the said levers are provided with tappet engaging members 42 and 43 which are adapted to be engaged by the tappets 44 provided upon the tappet disk 45 mounted upon the front cam shaft 25. One of these levers, when engaged and actuated by one of said tappets 44, has the function of permitting the clutch jaws to operatively engage each other and the other lever operates to disengage said jaws when the latter lever is engaged and actuated by another of said tappets. When the clutch jaws 35 and 36 are thus engaged, the cam is caused to operate one-half revolution and the clutch 32 consequently thrown into engagement with the pulley 31 whereby the spindle is rotated. In the old form of machine there is also provided a pulley 46, which is termed the reverse pulley, and is usually used for giving reverse rotation to the spindle by shifting the clutch 32 from engagement with the pulley 31 into engagement with the pulley 46 which is usually driven in an opposite direction by a cross belt. For the purpose of this invention, however, the cross belt is discarded and this pulley is provided with a brake band 47 tightly clasping and stationarily holding this pulley, the brake band being secured to a fixed part of the machine by the members 48 and 49. At proper intervals, when the rotation of the spindle is not desired, that is, at the time when the rod stock is to be held stationary, the clutch 32 is disengaged from the pulley 31 and thrown into engagement with the pulley 46. Inasmuch as the latter is held in stationary position by the brake, the spindle is brought to a stop and similarly held in stationary position.

At one end of the machine and opposite the chuck is mounted a turret slide 50 with a turret 51 thereon, carrying a series of tools which are to be utilized in performing operations upon the rod held in the chuck. The turret is mounted upon one end of a tubular shaft 52 with which it is adapted to rotate. At the other end of said tubular shaft is secured an indexing disk 53 which, when rotated, is adapted to successively turn the turret through predetermined angles each of 60 degrees. The indexing disk is provided with radial slots 54 in which is adapted to engage the crank pin 55 mounted upon the crank disk 56 secured to the end of a shaft 57 rotatably mounted in the turret slide. The shaft 57 also carries a spiral gear 58 with which meshes a similar gear 59 secured to a shaft 60 also mounted upon the turret slide. To the shaft 60 is also secured a spur gear 61 meshing with a gear 62 attached to a stud shaft 63 suitably mounted upon the main frame of the machine. The gear 62 in turn engages with a gear 64 fixed to a sleeve 65 loosely mounted upon the main drive shaft. The sleeve 65 is also provided with a clutch jaw 66 adapted to coöperate with a clutch jaw on the clutch member 24. The clutch jaw 66 and clutch member 24 may be thrown into engagement under the influence of a suitable spring upon the movement of the lever member 67 mounted upon the end of the lever 68. The other end of this lever carries a tappet engaging member 69 coacting with a tappet 70 secured to the tappet disk 71 mounted upon the front cam shaft 25. When actuated, the lever permits the movement of the clutch jaw 65 into engagement with the clutch jaw of the clutch member 24 and rotation is imparted to the gears 64, 62, 61, 59, 58 as well as to the crank disk 56. The crank pin is then brought into a position to enter one of the slots 54 of the indexing disk 53, and will cause the latter to rotate one-sixth of a revolution whereby a tool on the turret which has just completed its operation upon the rod may be swung away therefrom and another tool brought into position for the next operation upon said rod. The gear 61 is made sufficiently long in order that when the same is reciprocated with the turret slide, its engagement with the gear 62 will always be maintained.

The reciprocation of the turret toward and from the chuck, for the purpose of feeding a tool into its position for operation upon the rod and for withdrawing the same therefrom, is controlled by means of a specially designed cam 72. This cam and its function are hereinafter more fully described. The rear end of the turret slide is provided with a rack 73 with which is engaged a sector gear 74 provided at the end of the lever 75 fulcrumed upon a stud 76 mounted upon the machine. The other end of the lever 75 is provided with a roller 77 which engages with the surface of the cam 72.

For the purpose of imparting rotation to this cam, the main shaft 19 is provided at the end thereof with a spur gear 78 which meshes with the gear 79 mounted upon a stud secured to the frame of the machine. The gear 79 in turn engages with the gear 80 secured to an end of a short shaft 81 mounted in a bearing 82 on the frame of the machine, the other end of the shaft 81 carrying a worm 83. The latter engages with and actuates the worm gear 84 which is secured to an end of a cross shaft 85, suitably mounted in the machine frame. At the other end of this shaft is mounted a miter gear 86 which meshes with the miter gear 87 secured to the front cam shaft 25. Intermediate the ends of the cross shaft 85 is made fast therewith a spur gear 88 which engages the spur gear 89 fixed upon the shaft 90 to which is also secured the cam 72 mentioned above. Motion is, therefore, imparted to this cam from the main drive shaft through the train of gears 78, 79 and 80, the worm 83, worm gear 84, shaft 85 and spur gears 88 and 89, and the shaft 90 upon which is mounted the cam 72.

Locking means 91 of the usual form may be used to lock the turret into indexed position to maintain the tool during its operation in proper alinement with the rod stock operated upon. The locking means, however, is released by the cam 92 at the time when the crank disk 56 is rotated and crank pin 55 operates to turn the index disk 53 and the turret 51.

The turret shown in the drawing is adapted to carry a series of six tools, but in the form of the device used for the purpose of carrying out this invention, only five tools are necessary. The tools are of special design and are successively presented in the following order: First, a cutting-off and forming tool 93; second, a slotting tool 94; third, a combined wire carrying, inserting and swaging tool 95; fourth, a limit stop 96; and fifth, a necking tool 97. The turret is also adapted to carry a spool 98 upon which is stored a quantity of tungsten wire, the spool 98 being mounted upon the stud 99 resting in straps 100 secured to the turret proper. The tungsten wire 101 leads from the spool longitudinally through the tool 95 and protrudes at the outer end thereof.

The cutting-off and forming tool 93 is provided with a cylindrical shank 102 adapted to fit in the tool hole 103 of the turret and with a yoke frame 104 within which is adapted to slide a cutter 105 mounted upon a slide 106 slidably operable in the dove tail slide-way 107. The slide 106 carries an adjustable screw contact 108 against which the contact plate 109 on the back cross-slide 110 is adapted to engage to feed said cutter into cutting operation with the rod stock. The end of the cutter is formed with two cutting portions 111 and 112 (see Figs. 7 and 16), the former of which is for the purpose of shaping or tapering the end of the shank portion of the succeeding styli to be operated upon and the latter portion operates to sever the nearly completed stylus from the rest of the rod stock.

The slotting tool 94 is provided with a tubular shank 113 adapted to fit into the tool hole 114 of the turret and with a yoke frame 115 within which is pivotally mounted the rotary cutter 116. For the purpose of imparting rotation to the latter, the tubular shank 113, includes a shaft 117 at both ends of which are secured miter pinions 118 and 119. The miter pinion 118 engages and actuates a like pinion 120 fixed to the pivot shaft 121 upon which is mounted the rotary cutter 116 and the other miter pinion 119 is engaged and actuated by a like pinion 122 connected to an end of the shaft 123 extending through the tubular turret shaft 52. The other end of the shaft 123 is provided with a grooved pulley 124 which is driven by the belt 125. Rotation of this pulley is, therefore, imparted to the shaft 123, pinions 122 and 119, shaft 117, pinions 118 and 120, pivot shaft 121, and, finally, the cutter 116, the continuous rotation of which is maintained irrespective of the position of the turret.

The combined wire carrying, inserting and swaging tool 95 is hereinafter more fully described in connection with the description of the process of this invention, and is more fully illustrated in Figs. 9, 10 and 11, to which reference is made.

The limit stop 96 is provided with a cylindrical shank 126 adapted to fit in the tool hole 127 of the turret and with an abutment portion 128 in the end of which are provided recesses 129 and 130, the larger recess, 129, being shaped to suitably conform with the tapered end of the shank portion of the stylus, and the smaller recess, 130, providing for a clearance space for the tungsten tip.

The necking tool 97 is provided with a cylindrical shank 131 adapted to fit into the tool hole 132 of the turret and a tool carrying arm 133 to which is pivotally mounted the tool carrier 134. The latter is normally held away from the center line of the shank 131 by a suitable spring, but is adapted to be moved toward said center line by engagement of the contact plate 135 located upon the end of the front cross-slide 136 of the machine. The carrier 133 is provided with an adjustable contact screw 137 against which said contact plate 135 may engage. The carrier has mounted thereon the cutter 138, the end of which has a substantially V-shaped cutting edge, as is clearly shown in Figs. 14 and 15 of the drawing. This necking tool is also provided with a rigid tubular member 139 which is centrally bored to receive the end of the shank portion 140 of the partly-completed stylus for the purpose of supporting the same from deflection during the operation of the necking cutter upon said shank portion. This tubular member is also provided with a lateral slot 141 through which the end of the cutter may have access to the shank portion 140. This tubular member 139 also has a chamber in which the plate 142 carrying a block of stellite 143, is adapted to move during the engagement of the latter with the end of the tungsten tip. For this feature, reference is especially made to Figs. 14 and 15 of the drawing and to the description of the process of this invention.

The cam shaft 22, as shown, is mounted on the front portion of the machine in the bearings 144 and 145, and carries the tappet disks 26, 45 and 71 heretofore referred to and also the cams 146, 147, 148 and 149. The first two of these cams are of a special design and are mounted to coöperate with the ends of the levers 150 and 151 respectively, in order to operate the cross-slides 110 and 136. The other ends of these levers are provided with sector gears 152 and 153, the former of which is adapted to coöperate with a rack 154 fixed to the front cross-slide 136 and the latter of which engages a double sector gear lever 155 which in turn engages with a rack 156 secured to the back cross-slide 110. Both cross slides carry the shearing cutters 157 and 158, which are adapted to be brought together for the purpose of cutting the tungsten wire in a manner hereinafter more fully disclosed. The front cross-slide is also provided with a contact plate 135 which is adapted to engage with the cutter of the necking tool for the purpose of necking the rod in the manner hereinafter more fully described. The back cross-slide is also provided with a contact plate 109 which is adapted to contact with the cutter of the cutting-off and forming tool in a manner hereinafter more fully described. The cams 146 and 147 are provided, as shown, with the long lobes 159 and 160, which operate with the levers 150 and 151 substantially simultaneously for the purpose of giving the cross-slides reciprocation toward each other for the purpose of bringing the shearing cutters together. These cams are also respectively provided with a swell 161 and a dwell 162, of which the latter is adapted to coöperate with the lever 151 for the purpose of giving the front cross-slide a small movement whereby contact plate 135 engages with the cutter of the necking tool sufficiently to gage the depth of the cut thereof in the rod 1, and of which the former is adapted to coöperate with the lever 150 for the purpose of giving the back cross-slide a small and increasing movement whereby the contact plate 109 engages the cutting-off and forming tool for cutting off the shank portion of a nearly completed stylus and at the same time forming the front end of the rod for the shank portion of the succeeding stylus. This swell 161 is provided with increasing pitch in order that the cutting-off and forming tool may be fed radially of the rod.

The cam 72, shown more clearly in Fig.

21, is of special design for the purpose of reciprocating the turret head toward and from the chuck. The roller 77 is shown in contact with the cam at 163, at which point the swaging tool 95 is in position prior to its carrying the end of the tungsten wire to the slot in the slotted end of the rod 1. As the cam is rotated in the direction of the arrow, the roller rides over the swell 164 to the crest 165, whereby the turret and the tool 95 are first moved to insert the end of the tungsten wire into the slot 166, and then to swage the tapered end of the shank portion 140 thereabout, the latter action occurring just as the roller reaches the crest 165. Upon further rotation of the cam, the roller travels first over the incline 167 during which time the tool 95 is withdrawn over the wire 101, and then over the dwell 168 during which time the shearing cutters 157 and 158 are brought together to sever the tungsten wire at 169, the lobes 159 and 160 on cams 147 and 146 operating to bring said cutters together as aforesaid. Further rotation of the cam causes the roller to rise over the swell 170, whereby the limit stop 96, which has been rotated into place, is advanced to the proper position, the roller riding over the dwell portion 171 during the interval of feed of the rod stock 1 to the limit stop 96. The roller next drops to the trough 172 at which time the necking tool is presented before the end of the rod 1, and, as the roller travels over the gradual swell 173, the necking tool is caused to travel longitudinally of the rod shank for the distance of the length of the neck cut therein, the dwell 162 on cam 147 operating to control the depth of the cut so made. The roller next drops to the trough 174 at which time the necking tool is withdrawn, and the cutting-off and forming tool is brought into position at the side of the shank as shown in Fig. 17, the swell 161 on the cam 146 operating to move the rear cross-slide for the feeding of the cutter 105 into the rod stock, during all of which time the roller 77 is traveling over the dwell portion 175 of the cam 72. Still further rotation of this cam causes the roller to first drop to the trough 176 for withdrawal of the cutting-off and forming tool, and to then rise over the swell 177 during which time the slotting tool is presented and advanced to the end of the rod, the dwell portion 178 indicating and controlling the duration of time for the performance of the slotting operation thereon. The roller next drops to the trough 163 at which time the tool is again brought into position prior to its advancing toward and inserting the end of the tungsten wire into the slotted end of the rod, the initial position referred to in the above related cycle of operations.

There is also mounted upon the machine, as shown more specifically in Figs. 3 and 4 of the drawing, a transfer carrier, comprising a horizontal shaft 179 adapted to both rotate and longitudinally slide in the bearings 180 and 181 mounted upon the necking frame and a swinging arm 182 rigidly secured to one end of the shaft 179. Intermediate the ends of this shaft is secured thereto the collar 183 on both sides of which are loosely located the washers 184 and 185. A coil spring 191 is interposed between one of these washers and the bearing 180 and operates as it presses against the washer and collar to slide the shaft 179 in a direction toward the right as viewed in Fig. 3 of the drawings whenever the shaft has been displaced in the opposite direction. Movement of said shaft in the latter direction is imparted thereto by the cam 148 mounted upon the front cam shaft 25. This cam bears against an arm 186 of a bell-crank lever 187 fulcrumed upon the stud 188 secured to the machine frame, the other arm 189 of which carries an adjustable contact screw 190 adapted to constantly engage the washer 185. The cam 148, therefore, operates, during its rotation, to move the bell crank lever and the shaft 179 to the left as viewed in Fig. 3, the spring 191 returning the same as the cam surface permits.

At the other end of the shaft 179 is rigidly secured a slotted arm 192 within the slot of which the pin 193 is adapted to operate. This pin is mounted between the arms 194 and 195 of a lever system 196 fulcrumed upon the stud 197 mounted upon the frame of the machine. The other end of this lever system engages the cam 148 which is secured to the end of the front cam shaft 25. Rotation of the latter, therefore, imparts angular movement to shaft and a swing of the arm 182 from the full line position to the dotted line position thereof as shown in Fig. 4. The spring 198 which is connected to the lever 196 and the frame of the machine operates to return the arm and shaft to the full line position shown, as the cam surface permits.

The upper end of the arm 182 is provided with a socket 199 in which is disposed a slotted sleeve 200. The latter is also centrally bored to two diameters to loosely fit the stylus shank and tip, as is clearly shown in Figs. 17, 18, 19 and 20. When the arm is swung down to a position opposite the chuck, it is adapted to slide over the partly completed stylus, and to support it from deflection during the operation of the cutting off and forming tool upon the rod stock. When the cutting off tool has severed the shank portion of the stylus from the remainder of the rod stock, the transfer arm with the slotted sleeve is swung upwardly carrying with it the nearly completed stylus.

Adjacent the arm 182 and suitably mounted upon the frame of the machine, is a standard 201, the upper end of which is provided with a bearing supporting a rotatable shaft 202 upon an end of which is secured the belt driven grooved pulley 203 and upon the other end of which is secured a burring wheel 204. When the transfer arm carrying the nearly completed stylus has been swung to its position opposite the burring wheel, the arm may then be slowly moved toward the wheel so as to engage the rear end of the stylus shank against the periphery of the burring wheel for the purpose of burring and finishing the surface at that end of the shank. The slow movement mentioned is obtained by a slight swell in the cam 148 at that portion of the cam located between the points 205 and 206.

The standard is also provided with a lateral stop projection 207 which acts as a limit stop for the arm in its upward swing, an adjustable contact screw 208 being suitably mounted in said projection against which the arm may engage. The arm 182 is also provided with a lateral extension 209 adapted to abut the stop plate 210 secured to the machine frame in the downward swing of said arm opposite the chuck, this extension also carrying an adjustable contact screw 211 adapted to engage said plate 210. The stop projection 207 also carries an ejector strip 212 which extends into the slot of the socket 199 and sleeve 200 when the arm is swung to its upper position and the end of this ejector strip lies closely adjacent to the tungsten tip of the stylus with a corner 213 of said strip in contact with or closely adjacent to the tapered end of the shank of the stylus as is clearly shown in Fig. 19. After the rear end of the shank has been burred or finished, the stylus shank will be carried by endwise movement of the arm 182 and shaft 179, against the corner 213 of said strip and held in stationary position thereby until the sleeve 200 and socket 199 have completely withdrawn, whence the completed stylus is permitted to fall in a collecting receptacle.

The general operation of the machine is otherwise well understood and further statement thereto is unessential herein.

For the purpose of more clearly disclosing the process of my invention in making styli, illustrations have been made more or less diagrammatically in Figs. 7 to 20, inclusive, for the purpose of illustrating the successive steps or acts employed in a cycle of operations of the machine producing a stylus. In carrying out this process, a piece of wire or rod 1 of malleable metal, such as Bessemer steel, or any other suitable material for the purposes disclosed, is inserted through the chuck 2 and held thereby for rotation therewith at certain intervals, or in a stationary position at certain other times for the purposes of carrying out the operations of the tools thereupon. In the first step of the operation, the chuck and rod are rotated. The turret is indexed to a position, whereby the cutting-off and forming tool 93 is presented opposite the end of the rod, and is reciprocated by the cam 72 to a position where the cutting-off and forming tool presents the cutter 105 to one side of the rod 1 for the purpose of cutting-off and shaping the rod as shown in Fig. 7. At this instant the rear cross slide with the contact plate 109 engages with the cutter 105 on the cutting off and forming tool 93, and feeds the same gradually into cutting operation.

With this operation completed, the tappet disk 45 carries a tappet 44 under one of the levers 40 or 41 for the purpose of actuating the same to cause a shifting of the clutch jaw 35 into engagement with clutch jaw 36 whereby the clutch 32 is consequently disengaged from the rotating pulley 31 and thrown into engagement with the pulley 46 which is held in stationary position by the brake 47. In this way the chuck and rod are brought to a stop. The cam 72 is now rotated to a position whereby the turret with the cutting-off and forming tool are withdrawn. The tappet disk 71 then carries a tappet 70 into actuating engagement with the lever 68 to effect a throwing of the clutch jaw 66 into engagement with the clutch member 24 for the purpose of operatively connecting the main driving shaft through the train of gears leading to the crank disk 51, the rotation of the latter causing a turning of the indexing means as well as the turret head for presenting the next tool, namely, the slotting tool 94, to the end of the rod held in the chuck. As this tool is brought into alinement with the rod 1, the cam 72 operates to reciprocate the turret so as to bring the rotary cutter 116 into a position to cut a slot 166 in the tapered end of the rod as shown in Fig. 7. In a similar manner, the turret is again turned and presents the combined wire carrying, inserting and swaging tool 95 in alinement with the slotted end of the rod as shown in Fig. 9. Cam 72 upon further rotation, operates to slowly move the tool 95 toward the slotted end of the rod for the purpose of carrying and presenting the end 214 of the tungsten wire within the slot 166 and also for the purpose of bringing the die plate 215 into engagement with the tapered end of the rod as is shown in Fig. 10, further movement of the die plate being thus brought to a stop for the time concerned.

The tool 95 is of a special design and is constructed with a tubular casing 216 within which is adapted to slide longitudinally a plunger 217 with the forward end thereof projecting out through the end of the casing. This plunger is provided at its end with a recessed die plate 215 of hard metal adapted to engage and to swage the slotted end of the rod 1. Both the plunger and the die piece are centrally apertured for the purpose of permitting the passage therethrough of the tungsten wire 101. The plunger 217 is also provided with an annular flange 218 which normally bears against the inturned annular flange 219 integrally formed at the forward end of the casing 216. A coil spring 220 is interposed between the flange 218 and an annular shoulder 221 integrally formed with the casing 216, the spring 220 normally acting to urge the plunger into the projected position, relative to the casing, as is clearly shown in Fig. 9 of the drawing. The rear end of the plunger 217 is integrally provided with the tubular extension 222, the utility of which is hereinafter more fully disclosed. At the rear end of the casing is secured, by means of screw threads, a centrally apertured cap 223, which is also provided with the tubular extension 224 projecting within the casing 216 with the end thereof in alinement with and spaced away from the tubular extension 222. Surrounding the ends of both of these tubular extensions is a cylindrical hammer 225, which is adapted to slide within the casing as well as over both tubular extensions. Between the rear end of this hammer 225 and the inner face of the cap 223 is disposed an expansible coil spring which normally urges the hammer in a direction away from the cap and toward the annular shoulders 226 and 227 formed respectively upon the plunger 217 and the casing 216, against the latter of which the forward end of the hammer is normally in engagement, as shown in Fig. 9. A locking member 228 is disposed in a segmental slot 229 cut in the side of the hammer and projects radially inwardly sufficiently to engage with the end of the tubular extension 222 for the purpose of retaining the hammer in a position relative to said extension, as shown in Fig. 10, the inward movement of the locking member 228 being limited by the surfaces 230 at both sides of the hammer, against which the locking member normally rests. A flat spring 231, suitably secured at one end thereof by a screw 232 to the hammer, bears against the locking member to maintain the same in the positions indicated and shown in Figs. 9, 10 and 11. The plunger 217 is also provided with a chuck plug 233 disposed in a segmental slot 234 cut into the side of the plunger and is constantly in engagement with the tungsten wire 101. The frictional contact of this chuck plug with the tungsten wire, while sufficient to hold the wire in a forward movement of the tool 95 at the time when the end of the wire 214 is carried toward and inserted into the slot 166, is not sufficient to prevent the tool 95 from sliding backwardly over the wire after the end of the wire has been secured to the end of the rod after the swaging operation. The chuck plug 233 is normally urged inwardly by a suitable flat spring 235, one end of which is secured to the plunger by means of the screw 236.

As the turret is reciprocated with the tool 95 toward the end of the rod 1 at which time the die piece 215 is in engagement with the rod 1 and thus held in stationary position, the casing 216 with the cap 223 and extension 224 will continue to move relatively to said die, the plunger 217, the extension 222, as well as to the hammer 225, thereby compressing the spring 240. This position is shown in Fig. 10. As the casing is thus moved forwardly with the cap 223 and the extension 224, the latter will eventually be brought into engagement with the locking member 228 and, by reason of the inclined surface 238 provided at the end of the extension 224, will cause the locking member 228 to move radially outwardly sufficiently to disengage it from the rear end of the extension 222. Upon such disengagement, the hammer 225 will immediately be projected forward, under expansion of the spring 240, to contact with the shoulder 226, provided upon the plunger 217, thereby delivering a strong and quick impact to said plunger and hence to the die plate 215. The die plate is thus moved forwardly a short distance and the curved surfaces of the recess 239 in the die piece produce an inward swaging action against the tapered end of the rod 1, causing the same to be swaged about and around the end 214 of the tungsten wire 101, as shown in Fig. 11.

With this part of the operation completed, the tool 95 is then withdrawn a predetermined distance from the swaged end of the rod, over the tungsten wire, to the position shown in Fig. 12, at which time the cams 146 and 147 are in a position where the long lobes 159 and 160 act to cause both cross slides 110 and 136 to operate and drive the shearing cutters 157 and 158 into shearing position to cut off the tungsten wire at the point 169. The position of this point is chosen so that the length of the wire protruding from the swaged end of the rod will be the proper length and also the end of the wire protruding from the tool 95 shall be of the proper length to be presented subsequently to the slot cut in the rod for the next succeeding stylus. The position of the parts for this step of the process is clearly shown in Fig. 12.

With this step of the process completed, the turret next is operated to present the limit stop 96, at which time the tappet disk 26 is brought into operation so as to cause the main shaft 19 to operate the cams 9 and 17 whereby the collet or chuck jaws are opened and the stock feed tube is reciprocated to feed the rod through the open chuck into engagement with the limit stop 96 as shown in Fig. 13. The turret is then operated to withdraw the limit stop and present the necking tool to the end of the rod and at the same time the cams 9 and 17 operate to close the clutch jaws and to withdraw the feed tube, the tappet disk 45 also operating to effect the starting of the rotation of the chuck with the rod. The necking tool is brought into position opposite the end of the rod as shown in dotted lines in Fig. 14 and the cam 72 then operates to reciprocate the turret and this tool along the axis of this rod so that the supporting sleeve 139 of the necking tool surrounds the end of the rod 1 to support the same from deflection during the necking operation. The cutter 138, which is carried upon the necking tool, is, as shown in dotted lines in Fig. 14, spaced away from the rod by a suitable spring and is forced radially inwardly by means of the contact plate 135 carried on the front cross slide which, during its movement, as effected by the dwell 162 on the cam 147, feeds the cutter 138 into proper cutting depth engagement with the rod 1. Inasmuch as the rod 1 is small in diameter and it is difficult to cut the neck with a full width, it has been found advisable to use the narrow cutter and to perform the necking operation, first, by cutting-in to the proper depth and then feeding the cutter longitudinally of the axis of the rod to a final cutting position whereby the length of the neck so cut may be obtained as shown in Fig. 15. The cam 72 is so designed with the swell portion 173 that from the first phase of cutting the neck, as shown in Fig. 14, to the terminal phase, as shown in Fig. 15, the cutter will be given a slow and short longitudinal movement.

The necking tool also is provided with a means for smoothing or burring the end of the tungsten tip. This means may comprise a plate 142 in which is inserted a smoothing piece 143, such as stellite, provided, if desired, with a recess adapted to engage with the end of the tungsten tip. The rotation of the rod with the end of the tip against this piece has the effect of smoothing off the corners of the tip. At the rear of the plate 142 is located a spring 237 which is utilized for the purpose of maintaining the smoothing piece constantly in contact with the end of the tungsten tip.

With the necking operation completed, the necking tool is withdrawn and with the rod still rotating with the chuck, a transfer arm 182, which is mounted on the front portion of the machine, as shown in Figs. 3 and 4, is swung, by means of the cam 149, from the vertical position shown in full lines in Fig. 4, to a position opposite the end of the rod 1. The transfer arm carries at its end a slotted sleeve 200 which is so designed as to surround the end of the wire 1 and support the same during the cutting-off operation. The socket member 200 is first brought into the position shown in dotted lines in Fig. 17 and is then reciprocated longitudinally of the head to the full line position shown in the same figure whereby the stylus shank 140, which is still rotating, is supported therein while the cutting tool 93 is again brought into engagement with the rod 1 and severs the shank portion 140 therefrom. The socket sleeve 200 is provided with a V-shaped groove and a reduced diameter bore, the latter being for the purpose of permitting the end of the tungsten wire to rest therein. As the shank of the stylus is severed from the rod, the transfer arm is caused to swing upwardly to a position opposite a burring wheel or grinder 204 to the periphery of which the rear end of the shank is presented to bur or grind the same flat or nearly so. The transfer arm and socket, when brought into this position, presents the V-shaped slot, heretofore referred to, to a stationary ejector strip 212, the end of which is adapted to lie closely adjacent to the tungsten tip with the corner 213 in contact with the swaged end of the shank. When the burring operation upon the rear end of the shank is completed, the socket 199, with the sleeve 200, is then moved longitudinally rearwardly from the burring wheel as well as from the stationary ejector strip 212 and the stylus is, by such movement, permitted to drop, as shown in Fig. 20. The purpose of the stationary ejector strip 212 obviously is to merely prevent the stylus from being carried with the socket sleeve 200 in its movement away from the burring wheel and stationary member.

It will be seen from the above that the process disclosed has been carried out in the following sequence of steps; first, the cutting off of the previously formed shank and forming the forward end of the succeeding shank from the rod; second, slotting the formed end of the shank; third, inserting the end of the tungsten wire in said slot; fourth, swaging the formed end of the shank about the end of the tungsten wire inserted in the slot; fifth, withdrawing the swaging tool over the tungsten wire which is held in the swaged end of the rod whereby the wire is given a movement relative to the swaging tool for the purpose of gaging the proper length of the wire for cutting off the same as well as for the succeeding presentation of the end thereof to the next stylus; sixth, cutting the stylus wire at the proper length; seventh, feeding the shank stock or rod with the swaged end of the tungsten wire tip therein to a limit stop; eighth, necking the shank of the stylus as well as burring or smoothing the end of the tungsten tip; ninth, presenting the transfer carrier to the nearly completed stylus and cutting off the shank of the latter from the remainder of the stock; tenth, transferring the severed stylus to and burring the rear end of the shank thereof against a burring means; eleventh, ejecting the finished stylus from the transfer carrier.

It will be noticed also that the third, fourth and fifth steps of this operation are very much in the nature of three phases of a single step, namely that of inserting the tungsten wire, swaging the shank therearound and relatively advancing the wire through the swaging tool by the rear movement thereof. This general step of the operation is considered important.

With the above means and by the above method of producing styli, increased efficiency in operation and greater rapidity of production is attained, the time consumed in one complete cycle of operation is but a few seconds.

While one way in which the process of this invention may be performed, and one means or mechanism for carrying out the process, have been fully above disclosed, it is to be understood that many changes in the same are fully contemplated by me as within the aim and scope of the present invention so long as such changes are within the spirit and meaning of the appended claims.

Having thus described my invention, what I claim and desire to protect by Letters Patent of the United States is:

1. The method of making a sound reproducing stylus which consists in providing the end of a malleable metal rod with a recess, inserting the end of a continuous length of wire into said recess, swaging the end of said rod to close said recess around said wire to thereby permanently secure said wire to said rod, advancing a length of wire relative to and through the swaging means while said wire is held by said rod, and severing said wire and said rod.

2. The method of making a sound reproducing stylus which consists in providing the end of a malleable metal rod with a recess, bringing a swaging tool into engagement with said recessed end of said rod and simultaneously inserting the end of a substantially continuous length of wire into said recess, swaging said end of said rod to close said recess around said wire to thereby permanently secure said wire to said rod and severing said wire and said rod.

3. The method of making a sound reproducing stylus which consists in providing the end of a malleable metal rod with a recess, bringing a swaging tool into engagement with the recessed end of said rod and simultaneously inserting the end of a continuous length of wire in said recessed end of said rod, swaging the end of said rod to close the recess around said wire, severing said wire at a distance from the end of said rod, and severing said rod.

4. The method of making sound reproducing styli which consists in providing the end of a substantially continuous malleable metal rod with a recess, holding said rod stationary, inserting the end of a substantially continuous wire into the end of said recess, swaging said end of said rod to close said recess around said wire to permanently secure said wire to said rod, severing said wire at a distance from the end of said rod, advancing said rod, and cutting off said rod.

5. The method of making sound reproducing styli which consists in providing the tapered end of a substantially continuous metal rod with a recess, holding said rod stationary, inserting the end of a substantially continuous wire into the end of said recess, swaging the end of said rod to close said recess around said wire to permanently secure said wire to said rod, severing said wire at a distance from the end of said rod, rotating said rod, cutting off a length of said rod, and simultaneously tapering the end of said rod from which said length is being severed.

6. The method of making a sound reproducing stylus which consists in providing the end of a substantially continuous malleable metal rod with a recess, inserting the end of a substantially continuous length of fine wire in the end of said recess, swaging the end of said rod around said wire to permanently secure said wire to said rod, severing said wire at a distance from the end of said rod, severing said rod, transferring the severed portion of said rod to a burring position, and burring the end of said severed portion.

7. The method of making a sound reproducing stylus which consists in providing the end of a malleable metal rod with a recess, inserting the end of a continuous length of wire into said recess, swaging the end of said rod to close said recess around said wire to permanently secure said wire to said rod, advancing a length of wire relative to and through the swaging means while said wire is held by said rod by a movement of said swaging means opposite to its swaging movement, and severing said wire and said rod.

8. The method of making a sound reproducing stylus which consists in providing a malleable metal rod with a recess, inserting the end of a substantially continuous length of fine wire in said recess and swaging the end of said rod around said wire to permanently secure said wire to said rod, severing said wire at a distance from the end of said rod, advancing said rod, reducing the diameter of a portion of said rod at a distance from the end thereof, severing said rod and burring an end of the portion so separated from said rod.

9. The method of making a sound reproducing stylus of two parts which consists in forming the end of one part with a forming tool, cutting a slot in said formed end by means of a slotting tool, carrying the other part in a movable swaging tool to insert the end of said second-mentioned part into the slot of said first-mentioned part, forcing the swaging tool against the formed end of said first-mentioned part to swage the same around the inserted end of said second-mentioned part whereby the parts are secured together, withdrawing said swaging tool to a distance from the end of said first-mentioned part over said second-mentioned part whereby said second-mentioned part is advanced relatively to and through said swaging tool, forcing blades against said second-mentioned part to sever the same at a predetermined distance from the swaged end, the said first-mentioned part advancing the parts so secured against a limit stop for gaging the length of said first-mentioned part, necking said first-mentioned part, cutting off said first-mentioned part and forcing said cut off end of said severed part against a burring means for burring said end.

10. The method of making a sound reproducing stylus which consists in providing the end of a metal rod with a recess, inserting an end of a length of fine wire in said recess and swaging the end of said rod around said wire to fixedly secure the same together, advancing said rod, reducing the end of said rod at a distance back from the end thereof, smoothing the end of the inserted wire, and severing said rod.

11. The method of making a sound reproducing stylus which consists in providing the end of a substantially continuous metal rod with a recess, inserting the end of a substantially continuous length of fine wire in said recess and permanently securing said wire to said rod, severing said wire at a distance from the end of said rod, necking said rod and smoothing the severed end of the rod and smoothing the severed end of the wire so inserted, and cutting off the end of said rod.

12. In a method of producing styli, the steps of presenting a combined wire carrying and swaging device opposite the tapered and slotted end of a rod from which the shank portions of the styli are formed, moving said device toward and in contact with the tapered end of said rod whereby the end of said wire is inserted in said slot, forcing said device against said tapered end whereby the latter is swaged about the end of said wire, withdrawing said device from said swaged end to a distance whereby a length of said wire is relatively advanced therethrough and severing said wire and rod.

13. In an automatic machine for making sound reproducing styli out of substantially continuous lengths of stock material, comprising a head to hold the stock, to rotate the same, to intermittently feed the same forwardly, means to recess the end of said stock, and a tool carrying mechanism arranged to present in sequence a plurality of tools to operate upon said stock, the combination of an automatic swaging tool carried by said tool carrying mechanism, a die on the end of said swaging tool to engage and surround the end of said stock, said tool and die being provided with a longitudinal passage therethrough for a fine wire, means to deliver a continuous length of wire to and through said passage, and an impact mechanism to strike said die a swaging blow as said tool carrying mechanism moves toward said head, and after said die has engaged said stock, whereby the wire inserted by said swaging mechanism into said recess is permanently united to said stock.

14. In an automatic machine for making sound reproducing styli of substantially continuous lengths of stock material and comprising a head to hold said stock, means to provide the end of said stock with a recess and a turret mechanism arranged to present in sequence a plurality of tools to operate upon said stock, the combination of an automatic swaging tool mounted on said turret mechanism and having a longitudinal opening throughout the length thereof for receiving a continuous length of wire disposed in said opening and projecting from the end thereof, said tool comprising a sliding member, a die mounted on the end thereof, and an impact member placed under compression and then released by said sliding member as it is moved into said tool, whereby a movement of said turret mechanism toward said head brings said die over and around the end of the said stock and inserts said wire into said recess in the end of said stock, and slides said member into said tool, compresses said impact member and then releases said impact member to swage the end of said stock in said die around said wire, to permanently unite said wire and said stock.

15. In an automatic machine for making sound reproducing styli out of substantially continuous lengths of stock material and comprising a head to hold said stock, means to provide the end of said stock with a recess and a turret mechanism arranged to present in sequence a plurality of tools to operate upon said stock, the combination of an automatic swaging tool mounted on said turret mechanism and having a longitudinal opening throughout the length thereof for receiving a continuous length of wire disposed in said opening and projecting from the end thereof, said tool comprising a sliding member, a die mounted on the end thereof, an impact member placed under compression and then released by said sliding member as it is moved into said tool, whereby a movement of said turret mechanism toward said head brings said die over and around the end of the said stock and inserts said wire into said recess in the end of said stock, and slides said member into said tool, compresses said impact member and then releases said impact member to swage the end of said stock in said die around said wire, to permanently unite said wire and said stock, means for moving said turret mechanism in the reverse direction after said swaging operation to advance said wire through said swaging tool, and means to sever the inserted wire at a distance from the end of said stock.

16. In a device for making a sound reproducing stylus having a shank and a tip portion, the combination of means for holding a continuous piece of shank stock, means for shaping the end thereof, means for slotting said end, means for carrying a continuous piece of tip stock, inserting an end thereof into said slot and for swaging the end of said shank stock around the end of said tip stock to permanently secure said portions together, means to move said carrying means away from said shank stock whereby said tip stock is advanced relatively to said carrying means, means to sever said tip stock, and means to sever said shank stock.

17. In a device for making a sound reproducing stylus having shank and tip portions, the combination of means for holding a continuous length of shank stock, means for tapering the end of said shank stock, means for recessing said tapered end, mechanism for carrying a continuous length of tip stock and inserting an end thereof into said recess in its movement toward said tapered end, means carried on said mechanism for swaging said tapered end about the end of said tip stock, said mechanism operating to relatively advance a length of said tip stock therethrough in its movement away from said swaged end, and means for severing said shank and tip stocks.

18. In a device for making a sound reproducing stylus having shank and tip portions, the combination of means for holding a substantially continuous piece of shank stock, means for tapering the end of said shank stock, means for recessing said tapered end, means for carrying a substantially continuous length of tip stock and inserting an end thereof into said recess in its movement toward said tapered end, means carried on said carrying means for swaging said tapered end about the end of said tip stock, said carrying means operating to relatively advance a length of said tip stock therethrough in its movement away from said swaged end, means for gaging the length of the shank portion of said stylus, and means for severing said shank and tip stocks.

19. In a device for making a sound reproducing stylus having shank and tip portions, the combination of means for holding a substantially continuous piece of shank stock, means for tapering the end of said shank stock, means for slotting said tapered end, means for carrying a substantially continuous length of tip stock and inserting an end thereof into said slot in its movement toward said tapered end, means carried on said carrying means for swaging said tapered end about the end of said tip stock, said carrying means operating to relatively advance a length of said tip stock therethrough in its movement away from said swaged end, means for gaging the length of the shank portion of said stylus, means for severing said tip stock at a distance from said tapered end, means for necking said shank portion at a distance from said tapered end and means for severing said shank stock.

20. In a device for making a sound reproducing stylus having shank and tip portions, the combination of means for holding a continuous piece of shank stock, means for tapering the end of said shank stock, means for slotting said tapered end, means for carrying a continuous piece of tip stock and inserting an end thereof into said slot in its movement toward said tapered end, means carried on said carrying means for swaging said tapered end about the end of said tip stock, said carrying means operating to relatively advance a length of said tip stock therethrough in its movement away from said swaged end, means for gaging the length of the shank portion of said stylus, means for severing said tip stock at a distance from said tapered end, means for severing said shank stock, and means for burring the severed end of said shank portion.

21. In a device for making a sound reproducing stylus having shank and tip portions, the combination of means for holding a substantially continuous length of shank stock, means for tapering the end of said shank stock, means for slotting said tapered end, means for carrying a substantially continuous length of tip stock and inserting an end thereof into said slot in its movement toward said tapered end, means carried on said carrying means for swaging said tapered end about the end of said tip stock, said carrying means operating to relatively advance a length of said tip stock therethrough in its movement away from said swaged end, means for gaging the length of the shank portion of said stylus, means for severing said tip stock at a distance from said tapered end, means for smoothing the end of said severed tip, means for necking said shank portion at a distance from said tapered end and means for severing said shank stock.

22. In a device for making a sound reproducing stylus, the combination with means for holding a substantially continuous length of shank stock, means for providing the end thereof with a recess, means for inserting the end of a substantially continuous length of tip stock into said recess, and substantially simultaneously swaging the end of said shank stock around said tip stock to permanently unite said tip stock to said shank stock, means for severing said tip stock at a distance from the end of said shank stock, means for smoothing the severed end of the tip so inserted in said shank stock, and means for severing said shank stock.

23. In a method of producing styli, the steps of presenting a combined wire carrying and swaging device opposite the slotted end of a rod from which the shank portions of the styli are formed, moving said device toward and in contact with the end of said rod whereby the end of said wire is inserted in said slot, forcing said device against said end whereby the latter is swaged about the end of said wire, withdrawing said device to a distance from said swaged end whereby a length of wire is relatively advanced therethrough, severing said wire at a distance from the end of said rod, smoothing the severed end of said swaged wire, and severing said rod.

24. In a method of producing styli, the steps of presenting a combined wire carrying and swaging device opposite the tapered and slotted end of a rod from which the shank portions of the styli are formed, moving said device toward and in contact with the tapered end of said rod whereby the end of said wire is inserted in said slot, forcing said device against said tapered end whereby the latter is swaged about the end of said wire, withdrawing said device from said swaged end whereby a length of said wire is relatively advanced therethrough, severing said wire at a distance from the end of said rod, cutting off said rod and burring the severed end of said shank.

25. In a machine for making styli, including the means for holding a length of shank material in stationary position, the means for rotating the shank material at given times, and the means for feeding said shank material endwise at given times, the combination of means for recessing the end of said shank material, and means carrying in its forward movement a length of wire coaxially with the axis of the shank material, inserting the end of said wire in said recess, swaging the end of said shank material about the end of said wire, and in its backward movement relatively advancing a length of said wire therethrough, said last-mentioned means including a movable swaging member and movable means operative to deliver a blow to said swaging member to force said swaging member around and tightly against the inserted end of said shank material, said shank material remaining stationary.

26. The combination of an automatic machine for operating upon a piece of stock in continuous lengths and a device for carrying and presenting the end of a substantially continuous length of wire to the end of said piece of stock, and swaging the latter about the end of said wire in the forward movement of said device, and also relatively advancing said wire a given distance through said device upon reverse movement thereof.

27. In a device for operating upon rod and wire stock of substantially continuous lengths, comprising the rod stock-holding, rotating, feeding and severing means and the means for operating the same, the combination of a means for securing the wire stock to the rod stock and for relatively advancing a length of the wire stock through said means in a movement opposite to the securing movement thereof, and means for severing said wire stock.

28. In an automatic machine for operating upon stock of indefinite length, comprising means for holding and rotating the stock, means for feeding the stock to a distance, means for successively presenting operating tools thereto for performing operations thereon, and means for operating said means, the combination of means movable in one direction for inserting the end of an indefinite length of wire into the end of the stock and also for securing said ends permanently together, said means also operating to relatively advance a length of said wire through said means upon reverse movement thereof, and a means for severing said wire.

29. In an automatic machine for operating upon material of indefinite length including means for successively presenting a series of tools for performing given operations upon said material, the combination of means for carrying a material of indefinite length, presenting the end thereof to the end of the first-mentioned material and permanently swaging the same together, and means for severing said materials at points respectively spaced from the point of junction thereof.

30. In an automatic machine comprising rod stock holding, rotating and feeding means, and tool holding, positioning and operating means, the combination of means for recessing the end of said rod stock, means for inserting the end of a wire in said recess while said rod stock is held stationary and to swage the end of said slotted rod stock therearound, and means to sever said rod stock.

31. In an automatic machine, comprising stock holding, rotating and feeding means, tool holding means, and operating means for same, the combination of means carried by said tool holding means for uniting a body to the stock while said stock is held stationary, and means for severing the stock.

32. In a tool for swaging together two parts of a sound reproducing stylus, the combination of a casing, a plunger movable therein and projecting therefrom, a die piece on the projected part of said plunger, a hammer movable in said casing and adapted to engage said plunger to move the same, a resilient member constantly urging said hammer toward said plunger, an extension on said plunger, a lock member on said hammer normally engaging said extension, said casing adapted to move relative to said plunger to store energy in said resilient member, an extension carried by said casing operable during said relative movement of said casing and plunger to move the lock member from engagement from said plunger whereby said hammer is moved under the resilience of said resilient member to impart a blow to said plunger whereby said plunger and said die move to swaging position.

33. In an automatic machine comprising rod stock holding, rotating and feeding means, and tool holding, positioning and operating means, the combination of means for recessing the end of said rod stock, means for inserting the end of a wire in said recess while said rod stock is held stationary and to swage the end of said recessed rod stock therearound, and means to sever said wire.

34. In an automatic machine comprising stock holding, rotating and feeding means, tool holding means, and operating means for the same, the combination of means carried by said tool holding means for uniting a body to the stock while said stock is held stationary, and means for severing said body.

In witness whereof, I have hereunto set my hand this 14th day of January, 1919.

FREDERICK C. JONES